United States Patent [19] [11] 4,163,728
Cheng et al. [45] Aug. 7, 1979

[54] PREPARATION OF MAGNESIUM-CONTAINING DISPERSIONS FROM MAGNESIUM CARBOXYLATES AT LOW CARBOXYLATE STOICHIOMETRY

[75] Inventors: William J. Cheng; David B. Guthrie, both of St. Louis, Mo.

[73] Assignee: Petrolite Corporation, St. Louis, Mo.

[21] Appl. No.: 853,600

[22] Filed: Nov. 21, 1977

[51] Int. Cl.$^2$ .................... C10M 3/18; C10M 5/14; C10M 7/20; C10M 7/24
[52] U.S. Cl. ........................................ 252/18; 44/51; 44/DIG. 3; 252/25; 252/33; 252/39; 252/389 R
[58] Field of Search .................. 252/33, 39, 18, 25, 252/389 R; 44/51, DIG. 3

[56] References Cited

U.S. PATENT DOCUMENTS

| | | |
|---|---|---|
| 2,641,531 | 6/1953 | Austin et al. ....................... 423/636 |
| 2,641,532 | 6/1953 | Hicks .................................. 423/636 |
| 3,055,829 | 9/1962 | Wiley et al. ........................ 252/18 |
| 3,629,109 | 12/1971 | Gergel et al. ...................... 252/33 |
| 3,676,079 | 7/1972 | Morgan ............................... 423/636 |
| 3,689,218 | 9/1972 | Hodges ............................... 423/636 |
| 3,865,737 | 2/1975 | Kemp .................................. 252/33 |
| 4,065,396 | 12/1977 | Dickey et al. ..................... 252/33 |

Primary Examiner—Delbert E. Gantz
Assistant Examiner—Irving Vaughn
Attorney, Agent, or Firm—Sidney B. Ring; Hyman F. Glass

[57] ABSTRACT

This invention relates to stable, fluid magnesium-containing dispersions and the preparations thereof by the high temperature decomposition of Magnesium salts of carboxylic acids to MgO in a dispersant-containing fluid, where less than a stoichiometric amount of carboxylic acid is employed in forming the magnesium carboxylates, based on $Mg(OH)_2$ or equivalent.

16 Claims, No Drawings

PREPARATION OF MAGNESIUM-CONTAINING DISPERSIONS FROM MAGNESIUM CARBOXYLATES AT LOW CARBOXYLATE STOICHIOMETRY

Dispersions of magnesium-containing compounds have been heretofore prepared by various methods. One such method, which involves the reaction of Mg metal with an alcohol to form an intermediate magnesium alkoxide, is a complicated multi-stepped process. The following are illustrative:

U.S. Pat. Nos. 2,570,058, 2,834,662, 2,582,254, 2,895,913, 2,593,314, 2,939,808, 2,692,239 3,018,172, 2,788,325, 3,150,089.

Belgian Pat. No. 842,131.

Ulric B. Bray, Charles R. Dickey and Vanderveer Voorhees Ind. Eng. Chem., Prod. Res. Dev., 14, 295–8 (1975).

Other processes employing already formed MgO, although not considered suitable by Bray, Dickey and Voorhees (loc. cit.), are illustrated by the following:

U.S. Pat. Nos. 3,018,172, 3,865,737, 3,524,814, 3,928,216, 3,629,109.

Belgian Pat. No. 817,035.

Netherlands Application 6,410,242.

Application Ser. No. 816,626 filed July 18, 1977 disclosed and claims a facile method of preparing stable, fluid magnesium-containing dispersions which comprise heating $Mg(OH)_2$ above its dehydration temperature in the presence of a fluid of low volatility containing a dispersing agent soluble in said fluid.

The process of Ser. No. 816,626, in essence, comprises an almost "explosive" dehydration of magnesium hydroxide to magnesia according to the equation $$Mg(OH)_2 \rightarrow MgO + H_2O.$$

During this dehydration, $Mg(OH)_2$ is disintegrated into minute particles of MgO which are immediately suspended and become stabilized in the fluid by the presence of a dispersing agent.

In Ser. No. 840,192 filed Oct. 17, 1977, magnesium salts of carboxylic acids (magnesium carboxylates) in a dispersant-containing fluid are also "explosively" decomposed to magnesia. During this decomposition, the magnesium carboxylate is disintegrated into minute particles of MgO which are immediately suspended and stabilized in the fluid by the presence of a dispersing agent.

However, it is to be noted that a stoichiometric amount of carboxylic acids, based on $Mg(OH)_2$, or equivalent, is employed in forming magnesium carboxylates in Ser. No. 840,192.

We have now discovered that the process of Ser. No. 840,192 can be effectively carried out employing less than stoichiometric amounts of the carboxylic acid. For example, the process can be carried out employing minor percentages of the calculated stoichiometric amounts of carboxylic acid such as less than about 50%, such as about 10% or even 5% or less of the stoichiometric amounts of carboxylic acid. However, despite the fact that such minor stoichiometric amounts of carboxylic acids are employed, the yields of dispersed MgO are substantially the same as achieved by employing stoichiometric amounts of carboxylic acids and greater than that achieved without such minor amounts of carboxylic acid.

Apart from the fact that a low stoichiometry of carboxylic acid is employed, the reaction conditions and dispersion-forming temperature ranges in particular are essentially the same as in Ser. No. 840,192 and the disclosure therein is incorporated into the present application as if part hereof.

Since a low stoichiometric amount of carboxylate is employed, the reactant is in essence a mixture of magnesium carboxylate and magnesium hydroxide.

Any suitable carboxylic acid at low stoichiometry can be employed. These include mono- and polycarboxylic acids including aliphatic, aromatic, cycloaliphatic, etc., carboxylic acids. Representative examples include: formic acid, acetic acid, propionic acid, butyric acid, acrylic acid, maleic acid, etc. In view of the high volatility of aliphatic carboxylic acids, these are preferred, i.e., those of the formula

where R is aliphatic, preferably alkyl, such as those of the formula

where n is about 0–9 such as about 0–5, but preferably 1.

The fluid dispersions of MgO from magnesium carboxylate-magnesium hydroxide mixtures are achieved at the same low temperature range as for the dispersions of MgO derived only from stoichiometric magnesium carboxylate such as magnesium acetate. The temperature required to effect such decomposition is significantly lower than the temperature range required to form dispersions of MgO by the dehydration of $Mg(OH)_2$. The preferred decomposition range of magnesium carboxylate-magnesium hydroxide mixtures of the present invention is about 280°–330° C. This is about 30°–50° C. lower than the temperature range required for dehydration of $Mg(OH)_2$ which is about 310° to 380° C.

The conversion of Mg carboxylate—$Mg(OH)_2$ mixture to dispersed MgO is practically quantitative whereas the conversion of commercial technical grade $Mg(OH)_2$ in the absence of small amounts of magnesium carboxylate to dispersed MgO is only about 50%. Therefore in the practice of this invention, commercial technical grade $Mg(OH)_2$ is first transformed to magnesium acetate in situ in low stoichiometric amounts by the addition of acetic acid and then quantitatively converted to dispersed MgO at the process temperature in a dispersant-containing fluid.

Any suitable magnesium carboxylate capable of being subdivided upon decomposition into submicron particles of magnesia can be employed in the magnesium carboxylate-magnesium hydroxide mixture. Magnesium acetate is the preferred starting magnesium carboxylate compound in such mixture whether starting as the anhydrous solid, hydrated solid or aqueous slurry, or as magnesium carboxylate formed in situ.

Any suitable non-volatile process fluid capable of being heated to the decomposition temperature of the magnesium carboxylate-magnesium hydroxide mixture can be employed. The process fluid should be relatively stable and relatively non-volatile at the decomposition temperature. However, any volatility encountered is readily controlled by refluxing and condensing apparatus.

Examples of such non-volatile process fluids are as follows: hydrocarbons (such as mineral oil, paraffin oil, or aromatic oil), diphenyl oxide fluids, silicone oils, polyglycol ethers or vegetable oils, etc., solely the dispersant, or any combinations thereof.

The non-volatile process fluid should contain a dispersant(s) capable of retaining the magnesium compound formed by decomposition in stable suspension. Any suitable dispersant which is relatively stable under the decomposition conditions of this invention can be employed.

These are illustrated by the following: saturated and unsaturated fatty acids (such as stearic acid and oleic acid) and derivatives thereof (such as sorbitan monooleate), sulfonic acids (such as mahogany or petroleum derived sulfonic acids and synthetic sulfonic acids), naphthenic acids, oxyalkylated fatty amines, alkylphenols, sulfurized alkylphenols, oxyalkylated alkylphenols, etc.

The reaction is carried out as follows. Since the decomposition temperature of magnesium acetate is about 323° C. (613° F.), the reactant mixture containing both magnesium acetate and magnesium hydroxide is heated at about this temperature. The decomposition products from such mixture are removed from the reaction by their volatility. In practice, temperatures of about 230° C. to 400° C. or higher are employed, such as from about 260° C. to 370° C., but preferably from about 280° C. to 350° C.

The particle size of the resulting MgO so formed in general should be of a size which is stable and fluid. In practice, the particle size is no greater than about 5 microns, such as no greater than about 2 microns, but preferably no greater than about one micron.

The concentration of the magnesium compound so formed in the non-volatile process fluid should be no greater than that concentration which maintains suitable fluidity. In general, the final concentration based on non-volatile fluid and other materials is from about 1% to 32% when calculated as percent magnesium, such as from about 2% to 29%, for example, from about 3% to 26%, but preferably from about 4% to 23%.

The concentration of the dispersant in the non-volatile process fluid should be sufficient to maintain a fluid, stable dispersion of magnesium oxide in the fluid. In general the weight concentrations of dispersant and non-volatile fluid may range from 100% dispersant and 0% non-volatile fluid to as little as 0.01% dispersant and 99.99% fluid, such as from about 95% and 5%, for example from about 90% to 10%, but preferably from about 85 to 15%.

In the actual practice of commercializing the conversion of magnesium hydroxide to a stable fluid dispersion of MgO, we believe that the coarse particles in technical grade magnesium hydroxide are disintegrated by the action of small amounts of magnesium acetate prior to the dispersion-forming decomposition step, from which state the magnesium acetate-magnesium hydroxide mixture is readily converted quantitatively by the appropriate decomposition into a stable fluid dispersion of MgO.

In accord with the present invention, dispersions of magnesium oxide are now prepared from low-cost commercial sources of magnesium hydroxide by utilizing the principle of forming magnesium acetate in situ by employing low stoichiometry of acetic acid based on $Mg(OH)_2$, from which state the starting magnesium hydroxide is converted quantitatively into dispersible magnesium oxide without the installation of high-cost filtration or centrifugation equipment which otherwise would be required for product clarification and marketing as a stable dispersion.

The MgO dispersions of this invention can be further reacted to form dispersions of the corresponding derivatives. For example, afer decomposition in accord with this invention, the MgO dispersions can be further reacted with $CO_2$ to form $MgCO_3$ dispersions, reacted with $H_2O$ to form $Mg(OH)_2$ dispersions, etc.

The compositions of this invention have a wide variety of uses. The following are illustrative:

1. As a combination anti-corrosion and acidic neutralization additive for lubricating oils and greases.
2. As a combination anti-corrosion and acidic neutralization additive during the combustion of fuels such as residual fuel, pulverized sulfur-containing coal, or mixtures thereof.
3. As a combination anti-weathering and sealing agent for water-proofing cement, concrete, and asphaltic surfaces.
4. In proprietary pharmaceutical and cosmetic formulations.
5. As corrosion inhibitors, particularly in fuels containing vanadium.

Except for Ser. Nos. 816,626 and 840,192 prior art procedures do not prepare MgO dispersions by employing the high temperature range which is necessary for the product and process of this invention, and therefore, do not achieve a stable dispersible magnesium oxide but instead attempt to achieve magnesium dispersibility through other forms of magnesium compounds, particularly as carbonate. However, the prior art procedures are more complicated, more difficult to carry out, and less energy-efficient.

One high temperature process described in U.S. Pat. No. 3,055,829 involves the conversion of metal carboxylates to the metal carbonates.

In our invention the preferable dispersing agent is an organic carboxylic acid or sulfonic acid or any mixture thereof which reacts with the magnesium compound to form a salt or other complex. The magnesium salt or complex of such acid moiety is formed by the reaction of an equivalent of basic magnesium moiety (such as, for example, magnesium oxide, magnesium hydroxide, magnesium carbonate, or any mixtures thereof) with a corresponding equivalent of acid moiety.

The following examples are presented for purposes of illustration and not of limitation.

EXAMPLE 1

Example 1 illustrates the reaction without acetic acid.

To a 500-ml reaction flask equipped with agitator and thermometer are charged 150 g high-boiling hydrocarbon and 112.8 g (about 0.4 equiv.) naphthenic acids. The contents are heated to 85°–95° C. and 93.6 g (1.6 mole) commercial technical grade magnesium hydroxide are added.

When all the magnesium hydroxide has been added, the contents of the reactor are heated to 140° C. at which temperature water begins to come off by distillation. The heating is continued to 400° C. and until no further liberation of water is indicated. The net weight is 285.6 g. A 50.0 g. quantity of reaction mass is diluted with 50 g kerosene and the muddy-looking slurry is centrifuged. The weight of sediment collected, upon suitable extraction and drying, is about 4.4 g. The conversion of commercial technical grade magnesium hydroxide to fluid dispersion of MgO is calculated at only 55.6%.

EXAMPLE 2

Example 2 illustrates the reaction with about 5 mole % acetic acid.

To the reactor of Example 1 are charged 112.8 g naphthenic acids and 140.0 g high-boiling hydrocarbon oil. The contents are agitated and heated to 80° C. Commercial magnesium hydroxide 94.0 g (about 1.6 moles) is added through a powder funnel. The contents are heated to 210° C. and the water formed by the reaction of naphthenic acid with magnesium hydroxide is returned to the flask by a reflux condenser. The contents are cooled to 90° C. and 10 ml (0.17 mole) of glacial acetic acid and 10 ml $H_2O$ are added. The contents are then heated to about 125° C. under reflux. After two hours, the contents are heated such that free water is removed. Then heating is continued to 280°–350° C. to remove the necessary decomposition products during the formation of dispersed MgO. A sample of the reaction product is centrifuged; based on the amount of sediment and by the appropriate calculation, the conversion of commercial technical grade magnesium hydroxide to dispersed MgO is indicated to be 92%.

EXAMPLE 3

Example 3 illustrates the reaction with 5% acetic acid and colloidal milling.

To a suitable vessel equipped with agitators are charged 390 g hydrocarbon oil, 293.3 g naphthenic acids, 244.4 g (about 4.19 moles) commercial technical grade magnesium hydroxide, and 24.4 g (0.41 mole) glacial acetic acid. The contents are stirred and charged to a colloid mill at a setting of 0.001" clearance. The product of the first pass is passed twice more. A 366.4 g. sample is then heated as in example 2 to remove volatile matter and until no further decomposition products are removed during the formation of dispersed MgO. The product is centrifuged to remove undispersed material. Calculations based on the amount of sediment collected indicate that the conversion of commercial technical grade magnesium hydroxide to dispersed MgO is about 96%.

The process of Example 2 is repeated with the same high yields at the following mole percents of acetic acid:

Example 4: at 10 mole% acetic acid
Example 5: at 20 mole% acetic acid p1 Example 6: at 30 mole% acetic acid
Example 7: at 40 mole% acetic acid
Example 8: at 50 mole% acetic acid.

In addition, magnesium carboxylate-magnesium hydroxide mixtures can also be prepared by reacting other magnesium salts with carboxylic acids for example by reaction of $MgCO_3$, MgO, basic magnesium carbonate, etc. with the low stoichiometric amount of carboxylic acid necessary. The resulting magnesium carboxylate-magnesium hydroxide mixture can then be decomposed in accord with this invention.

USE AS CORROSION INHIBITOR FOR VANADIUM-CONTAINING FUELS

The demand for greatly increased amounts of energy has forced utilities and other large-quantity users of fossil fuels to explore low-quality fuels for use in steam boilers and gas turbines. Fuels such as unrefined crude oil and residual oil contain large amounts of impurities which result in corrosive deposits in the equipment. Two of these impurities, sodium and vanadium, form catastrophically corrosive, low melting slags that can destroy a vital part in a matter of hours.

Crude oil usually contains 1–500 ppm of vanadium in the form of a porphyrin complex depending on the source. Because of its origin as a concentrate from the refining process, residual oil contains several times more vanadium than the crude from which it was derived. The combustion of these vanadium-containing fuels produces very corrosive $V_2O_5$ deposits which can destroy a turbine part in a matter of hours. Although the vanadium can be removed, the cost of the process cancels the economic advantage of using unrefined fuels. Vanadic corrosion is, therefore, usually controlled with chemical additives and optimization of operating conditions.

Sodium is almost always present in low-quality fuels, either directly in the crude oil or indirectly through contamination from various sources. The technology for removing sodium is well developed. These are limiting processes, however, and a trace of sodium must always be dealt with. For example, in maritime use the sodium level can be increased because of the introduction of sodium chloride through the air intake and contamination of the fuel by sea water. During combustion, the sodium reacts with the sulfur in the fuel to form the sulfate which is deposited in turbine parts. This reaction has been shown to be thermodynamically favored and results in the only sodium compound that will deposit under these conditions.

The mechanism of corrosion by vanadium and sodium has received much attention. Nascent oxygen species has been proposed as the corrosive active agent in $V_2O_5$ melts. Various mechanisms have been presented to explain corrosive attack by sodium sulfate at metal surfaces. The classical method of inhibiting the corrosive characteristics of $V_2O_5$ and $Na_2SO_4$ melts has been to form high-melting vanadates of the former and minimize the level of the latter. Magnesium has been the most successful substance for this type of protection. The optimum levels of magnesium addition are not precisely known. Just as the mechanism of corrosion is only partially understood, so too is that of its inhibition.

There are other methods of limiting the corrosion such as reducing the operating temperature and maintaining the air to fuel ratio so that slightly reducing conditions exist during combustion. These types of methods may not be applicable. For example, the air to fuel ratio cannot be lowered to obtain reducing conditions in a gas turbine. Lower operating temperatures make the system less efficient and may be ruled out for economic reasons. Thus, chemical additives are often the best way to inhibit corrosion.

The compositions of this invention inhibit fireside corrosion in gas turbines, steam boilers and furnaces when incorporated into petroleum fuels in minor but effective amounts such as from about 1 to 2000 ppm, for example from 1 to 1000 ppm, but preferably from about 1 to 100 ppm, based on magnesium content.

USE AS ADDITIVES FOR AUTOMOTIVE AND INDUSTRIAL LUBRICANTS

A chemical additive in the usual sense refers to a material which enhances a desirable property while eliminating or minimizing one or more undesirable ones. Since about 1930 the commercial application of chemical additives to lubricating oils has kept pace with the increasing demands of modern machinery, such as automotive engines, high-speed machinery, high-pressure hydraulic control systems, etc. The literature and patent art are replete with examples of such additives which in general improve the lubrication performance for the machinery while minimizing the frequency of maintenance.

For combating the severe rust conditions which may be encountered during shipping of machinery or in long storage or exposure to out-door weather, sodium and calcium sulfonate additives are commonly used.

Additives for imparting detergency to lubricating oils are widely used at 2–20% concentration and are found to prevent or remove deposits of oil-insoluble sludge, varnish, carbon and lead compounds which otherwise form on internal combustion engine parts. The additives probably act by adsorbing and suspending the insoluble particles so that deposits are minimized, and cleanliness of rings, valves, and cylinder walls are maintained. Commercial detergent additive for such automotive and diesel engine oils are designed also to react chemically with the highly acidic by-products of combustion that find their way into the lubricating oil system. The additives with this type of functionality are usually comprised of basic barium, calcium, and magnesium salts of oil-soluble organic compounds.

A discussion of the preparation and use of overbased or hyperbasic detergent sulfonates is found in U.S. Pat. No. 3,057,896. The term "metal ratio," as used to describe the amount of overbasing or hyperbasic detergency in the additive, is defined as the ratio of equivalents of metal to equivalents of organic acid. The important metals which readily provide such overbasing are those of the alkaline earth group particularly magnesium, calcium, and barium.

The products of this invention at a metal ratio of about 15–16/1 can be employed as hyperbasic additives for lubricating oils.

We claim:

1. A process of preparing a stable, fluid magnesium-containing dispersion which consists essentially of decomposing a magnesium carboxylate to MgO in a nonvolatile process fluid capable of being heated to the decomposition temperature of the magnesium carboxylate also containing a dispersant capable of retaining the magnesium oxide formed by the decomposition in stable suspension at a temperature greater than about 230° C., said process containing less than a stoichiometric amount of carboxylate, based on $Mg(OH)_2$ or equivalent.

2. The process of claim 1 where the decomposition temperature is about 230° C. to about 400° C.

3. The process of claim 2 where the magnesium carboxylate is magnesium acetate.

4. The process of claim 1 where the process contains less than about 50% stoichiometric amount of carboxylate.

5. The process of claim 2 where the process contains less than about 50% stoichiometric amount of carboxylate.

6. The process of claim 3 where the process contains less than about 50% stoichiometric amount of carboxylate.

7. The process of claim 4 where the process contains less than about 10% stoichiometric amount of carboxylate.

8. The process of claim 5 where the process contains less than about 10% stoichiometric amount of carboxylate.

9. The process of claim 6 where the process contains less than about 10% stoichiometric amount of carboxylate.

10. The process of claim 7 where the process contains about 5% stoichiometric amount of carboxylate.

11. The process of claim 8 where the process contains about 5% stoichiometric amount of carboxylate.

12. The process of claim 9 where the process contains about 5% stoichiometric amount of carboxylate.

13. The process of claim 1 where the particle size of the MgO formed is no greater than about 5 microns.

14. The process of claim 1 where the particle size of the MgO formed is no greater than about 2 microns.

15. The process of claim 1 where the particle size of the MgO formed is no greater than about 1 micron.

16. The process of claim 1 where the conversion of the magnesium carboxylate mixture to dispersed MgO is from about 92% to about 96%.

* * * * *